(12) United States Patent
Meissgeier et al.

(10) Patent No.: US 11,092,259 B2
(45) Date of Patent: Aug. 17, 2021

(54) METHOD FOR PRODUCING AN ELECTROMAGNETIC VALVE ASSEMBLY AND ELECTROMAGNETIC VALVE ASSEMBLY

(71) Applicant: Vitesco Technologies GmbH, Hannover (DE)

(72) Inventors: Henry Meissgeier, Roding (DE); Andreas Muehlbauer, Bernhardswald (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/959,764

(22) PCT Filed: Jan. 2, 2019

(86) PCT No.: PCT/EP2019/050038
§ 371 (c)(1),
(2) Date: Jul. 2, 2020

(87) PCT Pub. No.: WO2019/134916
PCT Pub. Date: Jul. 11, 2019

(65) Prior Publication Data
US 2020/0370675 A1    Nov. 26, 2020

(30) Foreign Application Priority Data
Jan. 4, 2018 (DE) .................. 10 2018 200 084.0

(51) Int. Cl.
*F16K 31/06* (2006.01)
*B21B 1/22* (2006.01)

(52) U.S. Cl.
CPC ............ *F16K 31/0675* (2013.01); *B21B 1/22* (2013.01)

(58) Field of Classification Search
CPC ............................. F16K 31/0675; B21B 1/22
See application file for complete search history.

(56) References Cited

U.S. PATENT DOCUMENTS 6,341,759 B1    1/2002   Noller et al.
6,745,457 B2 *   6/2004   Noller .................. F02M 61/168
                                                        29/602.1
(Continued)

FOREIGN PATENT DOCUMENTS

DE       198 60 631        7/2000
DE     102005039288      2/2007
(Continued)

OTHER PUBLICATIONS

English translation of the International Search Report of the International Searching Authority for International Application PCT/EP2019/050038, dated Apr. 9, 2019, 2 pages, European Patent Office, HV Rijswijk, Netherlands.
(Continued)

*Primary Examiner* — Eric Keasel
(74) *Attorney, Agent, or Firm* — W. F. Fasse

(57) ABSTRACT

The invention relates to a method for producing an electromagnetic valve assembly (10), a planar metal sheet (12), which has through-slots (16) extending parallel to a longitudinal axis (14) of the sheet, and a disc (18), which has disc projections (22) that are complementary in shape to the through-slots (16), being provided, the disc projections (22) being engaged with the through-slots (16), and a coil housing (38) then being formed by the planar metal sheet (12) being shaped by non-overlapping roller-deforming along the longitudinal axis (14) of the sheet, around a circumference (20) of the disc (18). The invention further relates to an electromagnetic valve assembly (10) which has been produced in particular by means of such a method.

10 Claims, 4 Drawing Sheets

(56) References Cited

U.S. PATENT DOCUMENTS

| | | | |
|---|---|---|---|
| 8,245,402 B2 | 8/2012 | Seitter et al. | |
| 9,228,672 B2 * | 1/2016 | Hiyama | F16K 31/0668 |
| 2002/0175791 A1 | 11/2002 | LaMarca et al. | |

FOREIGN PATENT DOCUMENTS

| DE | 112006003389 | 10/2015 |
|---|---|---|
| DE | 102016200757 | 7/2017 |

OTHER PUBLICATIONS

PCT International Preliminary Report on Patentability including English Translation of PCT Written Opinion of the International Searching Authority for International Application PCT/EP2019/050038, dated Jul. 7, 2020, 7 pages, International Bureau of WIPO, Geneva, Switzerland.

German Office Action dated Sep. 18, 2018 in German Patent Application No. 10 2018 200 084.0, 6 pages, with partial English translation, 2 pages.

* cited by examiner

METHOD FOR PRODUCING AN ELECTROMAGNETIC VALVE ASSEMBLY AND ELECTROMAGNETIC VALVE ASSEMBLY The invention relates to a method for producing an electromagnetic valve assembly and to electromagnetic valve assembly that is in particular produced by a method of this kind.

In fuel injection systems, valve assemblies may be provided at various positions on the path taken by a fuel from a tank to a combustion chamber, for example as an inlet valve in a high-pressure fuel pump that pressurizes the fuel, but also, for example, as a relief valve at various positions in the fuel injection system, for example in a common rail that stores the pressurized fuel before being injected into the combustion chambers.

Electromagnetic valve assemblies, such as magnetic valves, that are opened and closed by means of a magnetic force, are often used for this purpose. In order induce said magnetic force, a coil housed in a housing is usually provided. Said housing is advantageously designed so as to be able to conduct the magnetic flux induced by the coil.

It is important that the coil be easily mountable in the housing, i.e. that collision-free insertion and a firm fit of the coil winding pack on which the coil wire has been wound are ensured. Furthermore, it is advantageous for the coil housing to be cost-effective in terms of manufacturing.

It was previously known for the coil housing to be formed in one piece by rotating and milling, i.e. by machining. This way of manufacturing is very costly, and the use of material is very high.

There are further known embodiments in which the coil housing is assembled in two parts by positioning and welding a disc in a tube.

The individual parts—the tube and the disc—can be cost-effectively produced by deep-drawing or punching and rolling; however, an additional joining process, i.e. the welding, is necessary. During the welding, changes in the magnetic properties may arise. Dimensional deviations may also arise as a result of the increased heat input.

The object of the invention is therefore to propose improved production of an electromagnetic valve assembly.

This object is attained by a method having the combination of features in claim 1.

An electromagnetic valve assembly that has been produced in particular by means of said method is the subject of the additional independent claim.

Advantageous embodiments of the invention are the subject of the dependent claims.

In a method for producing an electromagnetic valve assembly, the following steps are carried out:
  providing a planar metal sheet extending along a sheet longitudinal axis that has at least one through-slot extending parallel to the longitudinal axis;
  providing a disc that has at least one disc projection which is arranged on a circumference of the disc and which is complementary in shape to the through-slot;
  engaging the disc projection with the through-slot;
  forming a coil housing by non-overlapping roller-deforming the planar metal sheet by rolling along the sheet longitudinal axis, around the circumference of the disc to a tube portion.

By means of said described method, it is possible to provide in a simple and cost-effective manner a two-part coil housing in which the individual parts can be cheaply produced by punching, for example. In contrast with the known welding method, the connection between the two parts is achieved by roller-deforming the planar metal sheet, wherein the planar metal sheet is rolled around the disc. In the process, the disc projection is firmly pressed into the through-slot, thereby ensuring a more secure fastening of the disc in the coil housing.

In order for the planar metal sheet to completely, but non-overlappingly surround the disc after the roller-deforming, the planar metal sheet has, along the sheet longitudinal axis thereof, a length corresponding to the circumference of the disc.

The connection between the planar metal sheet and the disc is therefore form-fittingly established during the process of roller-deforming, because by means of the disc projection on the preferably punched disc, a form fit can be established in the through-slot in the preferably likewise punched planar metal sheet forming the tube portion.

The additional joining process known from welding can therefore be omitted because the disc can be rolled in during the roller-deforming. The axial position is dependent only on used punching dies.

Advantageously an engagement projection is provided at a first end region of the planar metal sheet along the sheet longitudinal axis thereof, and an engagement recess that is complementary in shape to the engagement projection is provided at a second end region of the planar metal sheet along the sheet longitudinal axis thereof. During the roller-deforming, the engagement projection form-fittingly engages with the engagement recess. As a result, a seam can be formed by the two end regions of the planar metal sheet form-fittingly engaging with one another so as to non-overlappingly hold the planar metal sheet in the shape of the tube portion.

Advantageously at least three through-slots are provided in the planar metal sheet, and at least three disc projections are provided on the disc. A length spacing between any two through-slots is equal to the length of an arc between any two disc projections. The larger the number of disc projections interacting with through-slots, the more securely the disc is secured in the tube portion to form the coil housing.

The through-slots are arranged on the planar metal sheet along the sheet longitudinal axis so as to be equidistant from one another in the rolled state, i.e. when the tube portion is already present. Accordingly, the disc projections are also arranged on the disc equidistantly from one another.

Advantageously the through-slots are provided in an edge region of the planar metal sheet that extends parallel to the sheet longitudinal axis. Particularly advantageously the through-slots are provided in the lower third of the planar metal sheet such that the disc can form a substantially lower closure of the coil housing.

Preferably, the disc is provided as an annular disc. It is thus later possible to push an assembly consisting of a sleeve comprising an armature and a pole core through an inner recess in the annular disc and thus to mount said assembly.

Preferably a planar metal sheet is provided that comprises a recess in an edge region extending in parallel with the sheet longitudinal axis, the edge region being arranged opposite the edge region in which the through-slots are located. The recess allows a plug assembly to later extend through the recess and out of the finished coil housing.

Preferably, a coil assembly is introduced into the coil housing, the coil assembly being brought into direct contact with the disc.

Further advantageously, a sleeve comprising an armature and a pole piece is inserted into the annular disc.

The coil housing having the coil assembly, armature and pole piece then forms a finished actuator region for actuating a valve.

An electromagnetic valve assembly comprises a coil housing and a coil assembly arranged in the coil housing, wherein the coil housing comprises a tube portion having equidistantly arranged through-slots and a disc having equidistantly arranged disc projections, wherein the disc projections engage with the through-slots, and wherein the coil assembly rests on the disc.

Advantageously, the tube portion comprises a seam, with an engagement projection and an engagement recess form-fittingly engaging with one another at the seam to hold the tube portion together, said engagement recess being complementary in shape to the engagement projection.

Preferably, the disc is designed as an annular disc, wherein a sleeve that comprises an armature and a pole piece is inserted into the annular disc.

An advantageous embodiment of the invention will be explained below in more detail, with reference to the attached drawings, in which.

Figure 1:
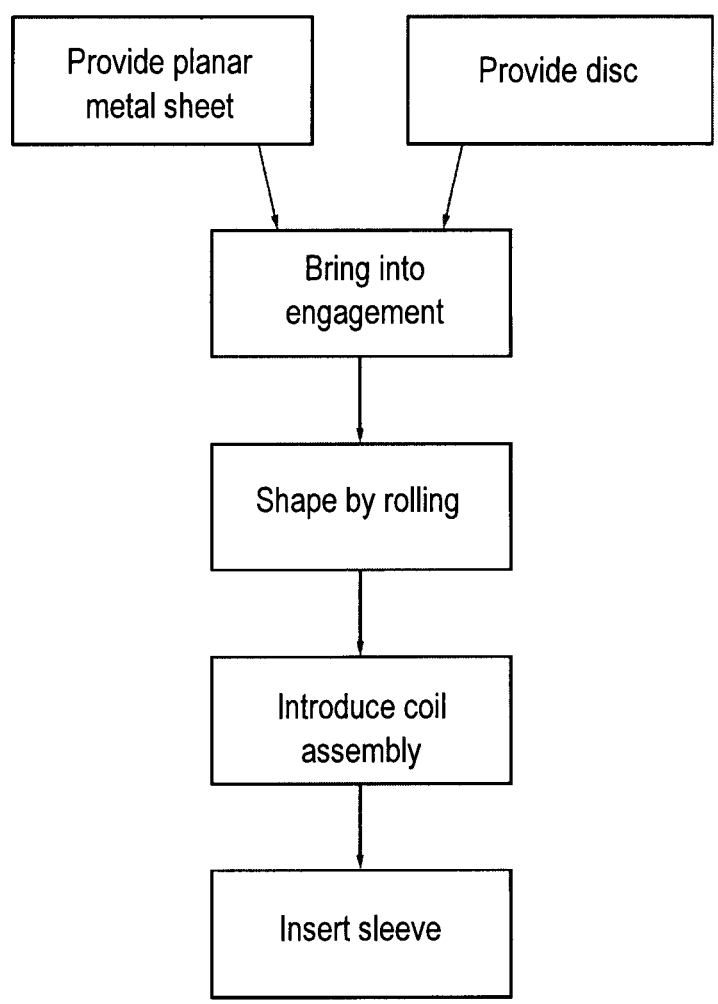
FIG. 1 is a flow diagram schematically showing individual steps of method for producing an electromagnetic valve assembly.

FIG. 1 is a schematic flow diagram that shows a method for producing an electromagnetic valve assembly 10. In the method, a planar metal sheet 12 having a through-slot 16 that extends along a sheet longitudinal axis 14 is first provided. A disc 18 having a disc projection 22 on the circumference 20 thereof is also provided, said disc projection being complementary in shape to the through-slot 16.

Figure 2:
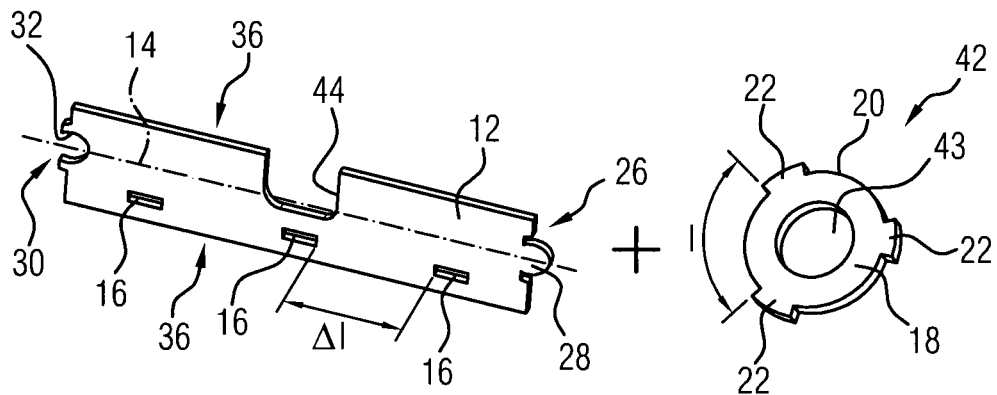
FIG. 2 is a perspective view of a planar metal sheet and a disc that are to be connected to form a coil housing.

FIG. 2 is a perspective view of such a planar metal sheet 12 and such a disc 18, the planar metal sheet 12 having three through-slots 16, and the disc 18 accordingly having three disc projections 22. A length spacing Δl between two adjacent through-slots 16 is equal to the length l of an arc on the circumference 20 of the disc 18 between any two disc projections 22.

Figure 3:
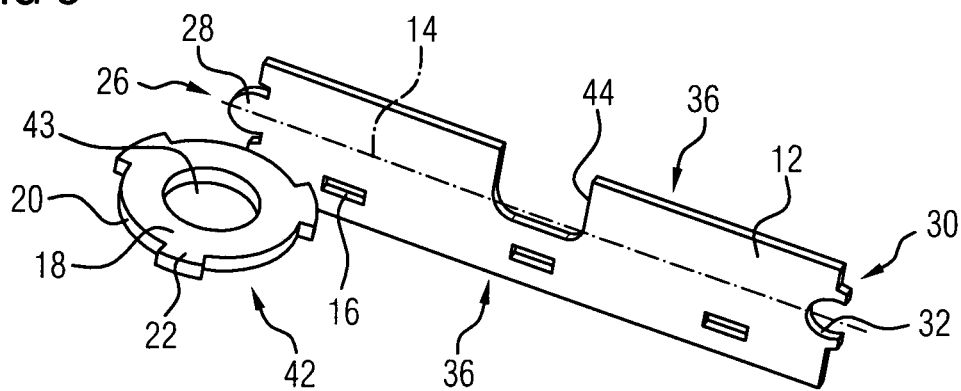
FIG. 3 is a perspective view of a disc projection on the disc from FIG. 2 and a through-slot in the planar metal sheet from FIG. 2 being brought closer together to engage with one another.

After the disc 18 and the planar metal sheet 12 have been provided in the method according to FIG. 1, a disc projection 22 is engaged with a through-slot 16. This is also shown in a perspective view in FIG. 3.

Figure 4:
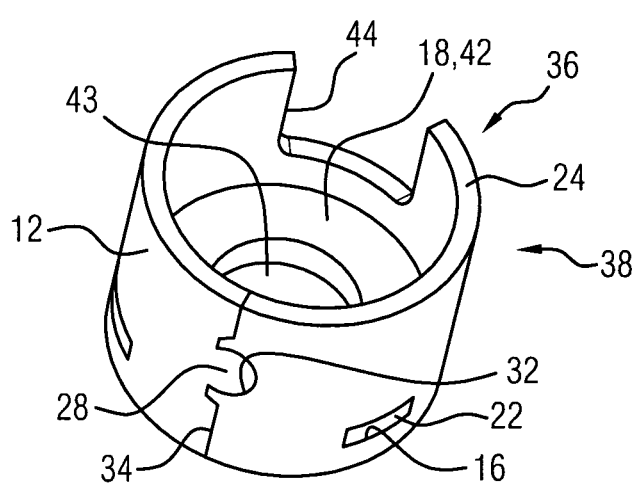
FIG. 4 is a perspective view of a coil housing formed from the disc and the planar metal sheet by means of shaping by rolling.

After the two elements have been engaged with one another, the planar metal sheet 12 is rolled in a further step by roller-deforming along the sheet longitudinal axis 14 to form a tube portion 24, the planar metal sheet 12 being placed around the circumference 20 of the disc 18, the further through-slots 16 being engaged with the further disc projections 22, and the disc 18 thus being form-fittingly fastened in the tube portion 24. In the process, the planar metal sheet 12 is rolled around the circumference 20 of the disc 18 so as to completely surround, but non-overlappingly rest on, the circumference 20. The perspective view in FIG. 4 shows the tube portion 24 formed by the roller-deforming and having the non-overlapping planar metal sheet 12 in which the disc 18 is arranged.

As can be seen in FIG. 2, the planar metal sheet 12 has an engagement projection 28 at a first end region 26 along the sheet longitudinal axis 14 thereof and an engagement recess 32 at a second region 30 arranged opposite the first end region 26 along the sheet longitudinal axis 14. When the planar metal sheet 12 is roller-deformed around the circumference 20 of the disc 18, the engagement projection 28 and the engagement recess 32 engage with one another so as to form a seam 34 at which the planar metal sheet 12 remains held in the shape of the tube portion 24 by means of a form fit.

The through-slots 16 are arranged in an edge region 36 of the planar metal sheet 12 that extends parallel to the sheet longitudinal axis 14, such that the disc 18, after the roller-deforming, can provide a lower closure of the tube portion 24 and thus a coil housing 38 for receiving a coil assembly 40.

The disc 18 is designed as an annular disc 42 and has a cut-out 43 such that elements of the valve assembly 10 can be pushed through the disc 18 and thus mounted. The planar metal sheet 12 also has a cut-out 44 that is arranged in an edge region 36 which extends parallel to the sheet longitudinal axis 14 and which is opposite the edge region 36 in which the through-slots 16 are arranged.

Figure 5:
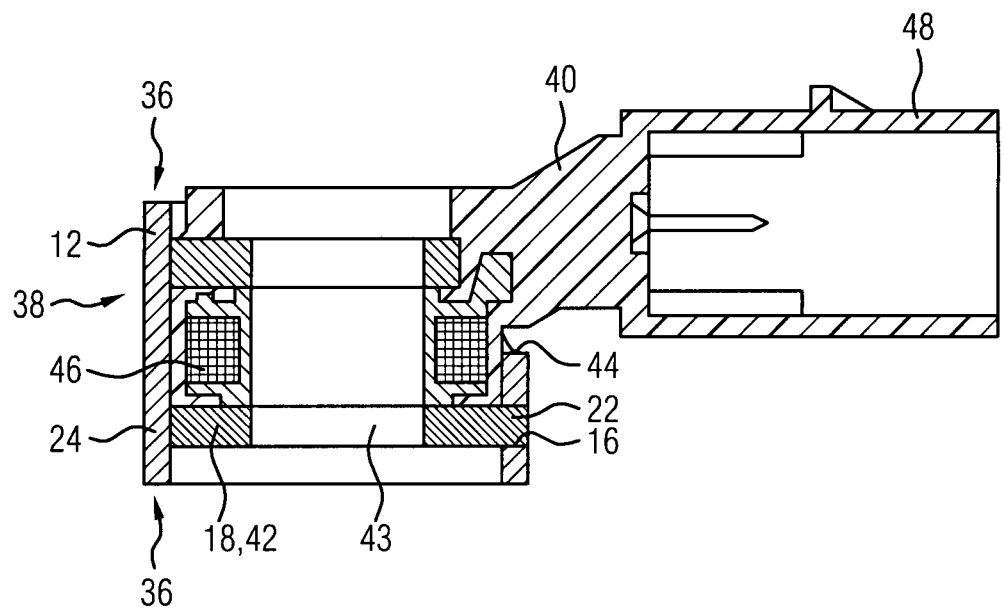
FIG. 5 is a longitudinal sectional view through the coil housing from FIG. 4, a coil assembly being fastened in the coil housing with the coil resting on the disc.
Figure 6:
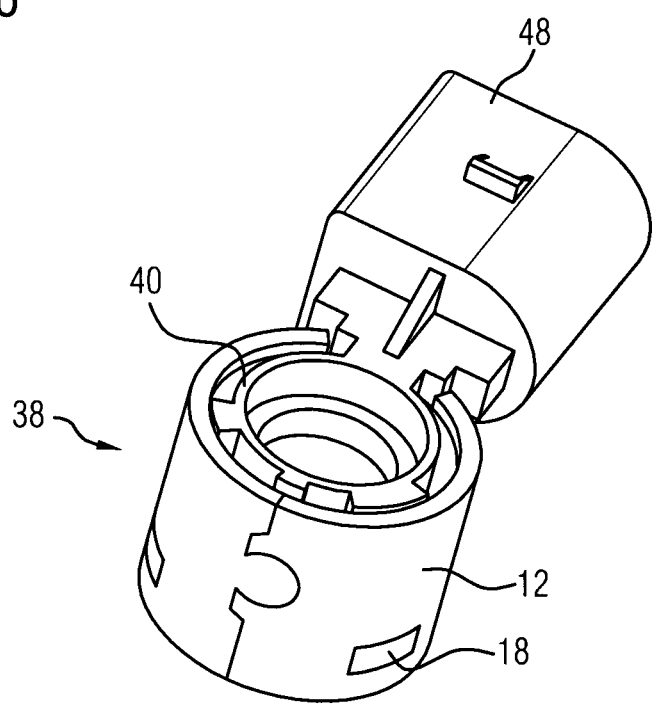
FIG. 6 is a perspective view of the coil housing with the coil assembly from FIG. 5.

With reference to FIG. 1, after the step of roller-deforming, a coil assembly 40 is introduced into the coil housing 38 in a further step. The coil assembly 40 comprises a coil 46 and a plug assembly 48, it being possible for the plug assembly 48 to extend outwards through the cut-out 44 in the planar metal sheet 12. The coil assembly 40 rests on the disc 18 and is thus held in the coil housing 38. FIG. 5 is a longitudinal sectional view through the coil housing 38 from FIG. 4 with the coil assembly 40 introduced therein. FIG. 6 is a corresponding perspective view of the coil housing 38 together with the coil assembly 40.

Figure 7:
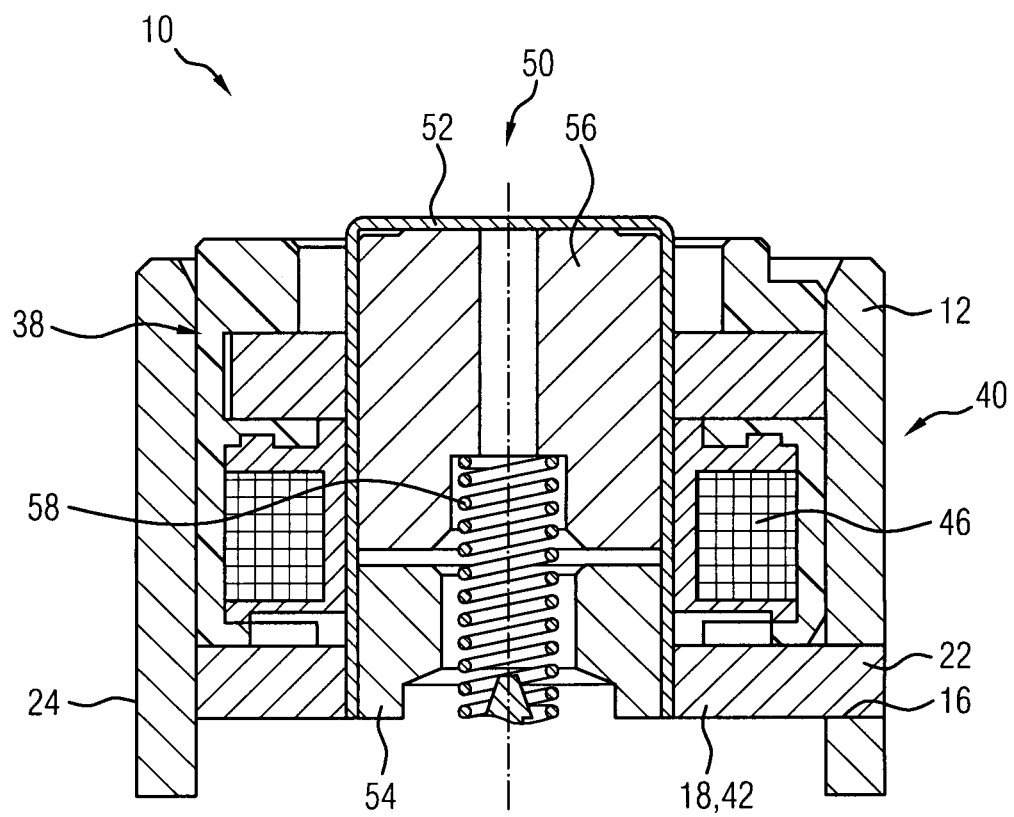
FIG. 7 is a perspective longitudinal sectional view through the coil housing with the coil assembly from FIG. 5, a sleeve that comprises an armature and a pole piece having additionally been introduced into the coil assembly.

To lastly form an actuator 50 of the valve assembly 10, a sleeve 52 is inserted into the annular disc 42 in a last step, an armature 54 and a pole piece 56 being arranged in the sleeve 52, said armature and pole piece being held spaced apart from one another by a spring 58. The actuator 50, with the coil housing 38, coil assembly 40 and sleeve 52, is shown in FIG. 7 in a schematic longitudinal sectional view.

The invention claimed is:

1. A method for producing an electromagnetic valve assembly (10), comprising the steps of:
    providing a planar metal sheet (12) extending along a sheet longitudinal axis (14) that has at least one through-slot (16) extending parallel to the sheet longitudinal axis (14);
    providing a disc (18) having at least one disc projection (22) arranged on a circumference (20) of the disc (18) and complementary in shape to the through-slot (16);
    engaging the disc projection (22) with the through-slot (16);
    forming a coil housing (38) by non-overlapping roller-deforming the planar metal sheet (12) along the sheet longitudinal axis (14), around the circumference (20) of the disc (18) to a tube portion (24).

2. The method according to claim 1, characterized by providing an engagement projection (28) at a first end region

(26) of the planar metal sheet (12) along the sheet longitudinal axis (14) thereof, and an engagement recess (32) at a second end region (30) of the planar metal sheet (12) along the sheet longitudinal axis (14) thereof, said engagement recess being complementary in shape to the engagement projection (28), the engagement projection (28) form-fittingly engaging with the engagement recess (32) during the roller-deforming.

3. The method according to claim 1, characterized by providing at least three through-slots (16) in the planar metal sheet (12) and at least three disc projections (22) on the disc (18), a length spacing ($\Delta 1$) between any two through-slots (16) being equal to the length (1) of an arc between any two disc projections (22).

4. The method according to claim 1, characterized by providing the at least one through-slot (16) in an edge region (36) of the planar metal sheet (12) that extends parallel to the sheet longitudinal axis (14).

5. The method according to claim 1, characterized by providing the disc (18) as an annular disc (42).

6. The method according to claim 5, characterized by inserting a sleeve (52) into the annular disc (42), said sleeve comprising an armature (54) and a pole piece (56).

7. The method according to claim 1, characterized by introducing a coil assembly (40) into the coil housing (38).

8. An electromagnetic valve assembly (10), produced by a method according to claim 7, comprising the coil housing (38) and the coil assembly (40) arranged in the coil housing (38), wherein the coil housing (38) comprises the tube portion (24) having equidistantly arranged through-slots (16) and the disc (18) having equidistantly arranged disc projections (22), wherein the disc projections (22) engage with the through-slots (16), and wherein the coil assembly (40) rests on the disc (18).

9. The electromagnetic valve assembly (10) according to claim 8, characterized in that the tube portion (24) comprises a seam (34), with an engagement projection (28) and an engagement recess (32) form-fittingly engaging with one another at the seam (34) to hold the tube portion (24) together, said engagement recess being complementary in shape to the engagement projection (28).

10. Electromagnetic valve assembly (10) according to claim 8, characterized in that the disc (18) is designed as an annular disc (42), wherein a sleeve (52) that comprises an armature (54) and a pole piece (56) is inserted into the annular disc (42).

* * * * *

UNITED STATES PATENT AND TRADEMARK OFFICE
CERTIFICATE OF CORRECTION

PATENT NO. : 11,092,259 B2  
APPLICATION NO. : 16/959764  
DATED : August 17, 2021  
INVENTOR(S) : Henry Meissgeier et al.

Page 1 of 1

It is certified that error appears in the above-identified patent and that said Letters Patent is hereby corrected as shown below:

In the Claims

Column 5,  
Line 13, (4$^{th}$ Line in Claim 3), after "spacing", replace "(Δ1)" with -- (Δl) --;  
Line 14, (5$^{th}$ Line in Claim 3), after "length", replace "(1)" with -- (l) --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*